US007762499B1

(12) United States Patent  (10) Patent No.: US 7,762,499 B1
Hentosh et al.  (45) Date of Patent: Jul. 27, 2010

(54) INDEPENDENT EAST/WEST THERMAL MANAGEMENT SYSTEM

(75) Inventors: David J. Hentosh, Yardley, PA (US); John Lafergola, Englishtown, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 928 days.

(21) Appl. No.: 11/528,768

(22) Filed: Sep. 28, 2006

Related U.S. Application Data

(60) Provisional application No. 60/721,084, filed on Sep. 28, 2005.

(51) Int. Cl.
*B64G 1/50* (2006.01)
(52) U.S. Cl. ...................... 244/171.8; 165/41
(58) Field of Classification Search .............. 244/158.1, 244/171.8, 172.7; 165/41
See application file for complete search history.

(56) References Cited

U.S. PATENT DOCUMENTS

| | | | |
|---|---|---|---|
| 5,372,183 A * | 12/1994 | Strickberger ................ 165/41 |
| 5,806,800 A | 9/1998 | Caplin |
| 5,839,696 A | 11/1998 | Caplin et al. |
| 5,957,408 A * | 9/1999 | Hall et al. ................ 244/158.1 |
| 6,003,817 A * | 12/1999 | Basuthakur et al. ......... 244/164 |
| 6,378,809 B1 * | 4/2002 | Pon .......................... 244/171.8 |
| 6,883,588 B1 * | 4/2005 | Low et al. ...................... 165/41 |
| 2004/0232284 A1 * | 11/2004 | Tjiptahardja et al. ........ 244/163 |

\* cited by examiner

*Primary Examiner*—Rob Swiatek
(74) *Attorney, Agent, or Firm*—McDermott Will & Emery LLP

(57) ABSTRACT

A satellite thermal management system for dissipating excess heat generated within a satellite. The thermal management system includes a central platform for mounting heat dissipating components. A first thermal radiator panel and a second thermal radiator panel are mounted to the central platform. The first thermal radiator panel is arranged to face East when the satellite is in orbit. The second thermal radiator panel is arranged to face West when the satellite is in orbit. The first and second thermal radiator panels are thermally coupled to the central platform and are configured to radiate heat dissipated by the heat dissipating component mounted on the central platform.

19 Claims, 5 Drawing Sheets

INDEPENDENT EAST/WEST THERMAL MANAGEMENT SYSTEM

This application claims the benefit of U.S. Provisional Patent Application No. 60/721,084 filed on Sep. 28, 2005.

STATEMENT REGARDING FEDERALLY SPONSORED RESEARCH OR DEVELOPMENT

Not applicable.

FIELD OF THE INVENTION

The invention relates to the dissipation of heat generated within a satellite and, more particularly, concerns an independent thermal management system for dissipating heat.

BACKGROUND OF THE INVENTION

Heat dissipation is a significant issue faced by engineers when designing the components and configuration of a satellite. As satellite missions become more complex, an increasing number of electrical components must be included in the payload space of the satellite. However, the size of the payload space, together with the overall size of the satellite, is limited by the weight and payload capacities of satellite launch vehicles. Accordingly, the electrical components of a satellite are typically arranged in a relatively dense configuration. If the heat generated by these electrical components is not dissipated sufficiently, the performance of the satellite may suffer or even fail completely.

Heat dissipation is typically performed using thermal radiator panels having a face exposed to the cold temperatures of space. By thermally coupling the electrical components inside the satellite to the thermal radiator panels, heat generated by the electrical components inside the satellite is radiated into space. In three-axis stabilized systems commonly used today, two primary thermal radiator panels are used for heat dissipation. One of the thermal radiator panels is arranged to face North when the satellite is in orbit and the other thermal radiator panel is arranged to face South when the satellite is in orbit. While this design provides a general solution to the heat dissipation problem, significant limitations still exist.

As noted above, the size and configuration of a satellite are limited by factors such as the satellite launch vehicle. Under these constraints, there is a limited amount of space on the surface of the satellite that can be occupied by the North/South thermal radiator panels. This space is further limited by the fairing of the satellite and the antenna constraints imposed by the satellite mission. Accordingly, the ability to increase the surface area of the North/South thermal radiator panels to handle increased heat dissipation is limited.

Another issue not easily addressed using conventional heat dissipation solutions is the need to provide and maintain separate temperature zones for components having different thermal requirements. Typically, payload components are arranged in a common space and are thermally coupled to a common thermal radiator panel. While this solution may be satisfactory for components having similar thermal requirements, often times one or more components must be maintained at a cooler temperature than the rest.

Accordingly, a need exists for a thermal management system capable of providing additional as well as diverse heat dissipation requirements within the constraints imposed by satellite design.

SUMMARY OF THE INVENTION

The invention provides an independent thermal management system for increasing and improving the heat dissipation capabilities of a satellite. This novel system uses available East and West facing surface areas on a satellite to provide additional thermal radiator panels. These East/West thermal radiator panels are connected to a common platform on which electrical components are mounted and dissipate the heat generated by the electrical components. The system is further capable of operating independently of a main cooling system in the satellite or, alternatively, can be connected to the main cooling system to supplement that system.

According to one aspect of the invention, a satellite thermal management system is provided for dissipating excess heat generated within a satellite. The thermal management system includes a central platform for mounting heat dissipating components. A first thermal radiator panel and a second thermal radiator panel are mounted to the central platform. The first thermal radiator panel is arranged to face East when the satellite is in orbit. The second thermal radiator panel is arranged to face West when the satellite is in orbit. The first and second thermal radiator panels are thermally coupled to the central platform and are configured to radiate heat dissipated by the heat dissipating component mounted on the central platform.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components may be shown in block diagram form in order to avoid obscuring the concepts of the invention.

Figure 1:
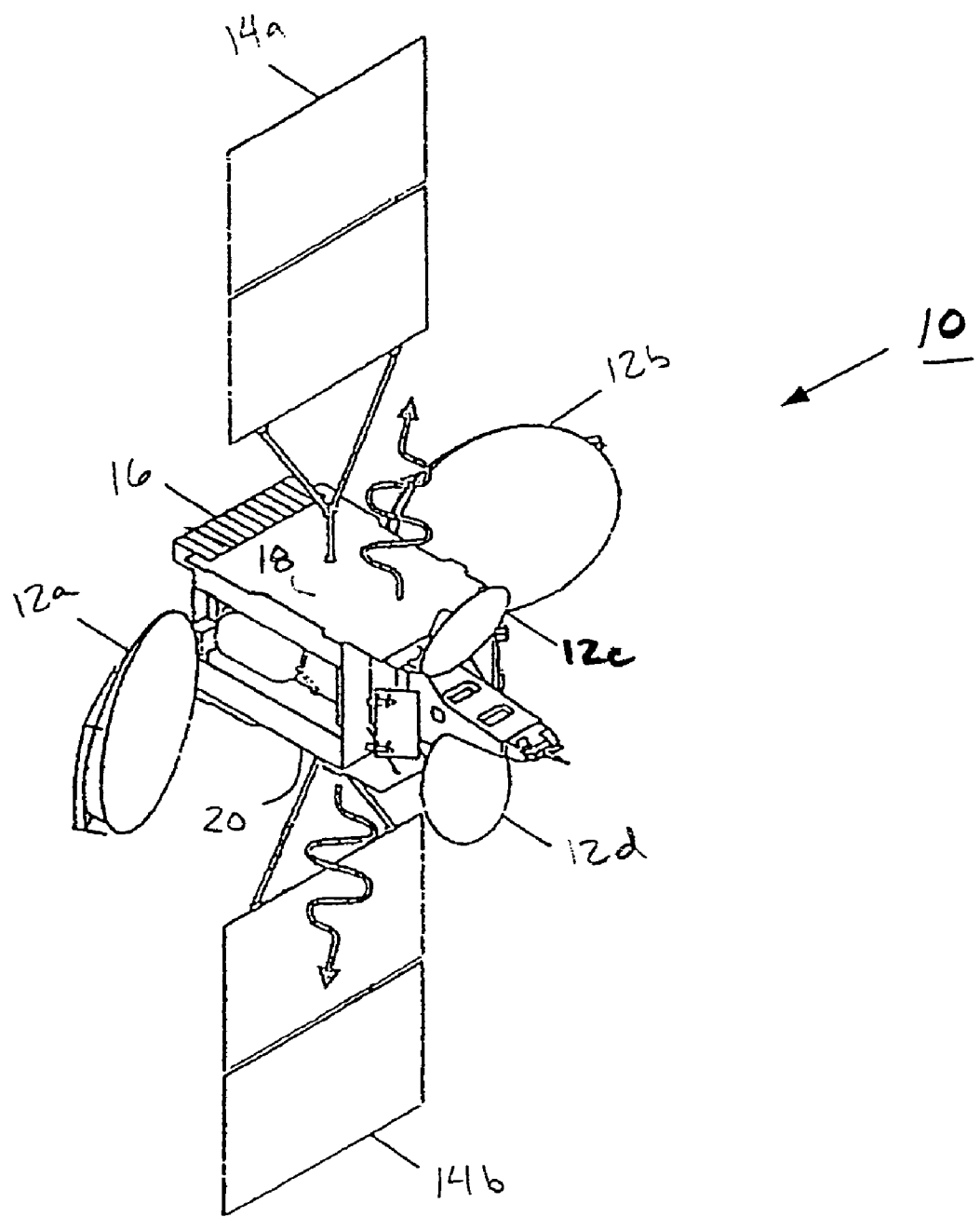
FIG. 1 is a diagram depicting components of a satellite.

FIG. 1 is a diagram depicting an example of a satellite 10. Satellite 10 includes reflector dish antennas 12a to 12d, solar panel arrays 14a and 14b, payload compartment 16 and thermal radiating panels 18 and 20. As shown in FIG. 1, satellite 10 has the reflector dish antennas 12a to 12d and the solar panel arrays 14a and 14b deployed in an operational configuration. Specifically, reflector dish antennas 12a to 12d are extended so as to be capable of sending and/or receiving radio frequency signals. To provide power to satellite 10, solar panel arrays 14*a* and 14*b* are positioned to collect and store solar energy in one or more batteries (not shown) located within satellite 10.

Payload compartment 16 contains payload components used to perform the mission of the satellite. The payload components typically include power supply systems, radio frequency transmission systems, radio frequency reception systems, data processing systems, monitoring systems, etc. Many of these payload components, such as power supplies and power amplifiers, are heat dissipating components that generate heat within payload compartment 16. To ensure proper operation of satellite 10, excess heat generated within satellite 10 must be dissipated.

Satellite 10 includes a conventional heat dissipation system that utilizes thermal radiating panels 18 and 20. Thermal radiating panel 18 is arranged to face North and thermal radiating panel 20 is arranged to face South while satellite 10 is in operation. Thermal radiating panels 18 and 20 are thermally coupled to the payload components located within payload compartment 16 and dissipate excess heat generated by those components via the thermal coupling. This North/South thermal management system is well known to those skilled in the art and will not be described further herein.

Figure 2:
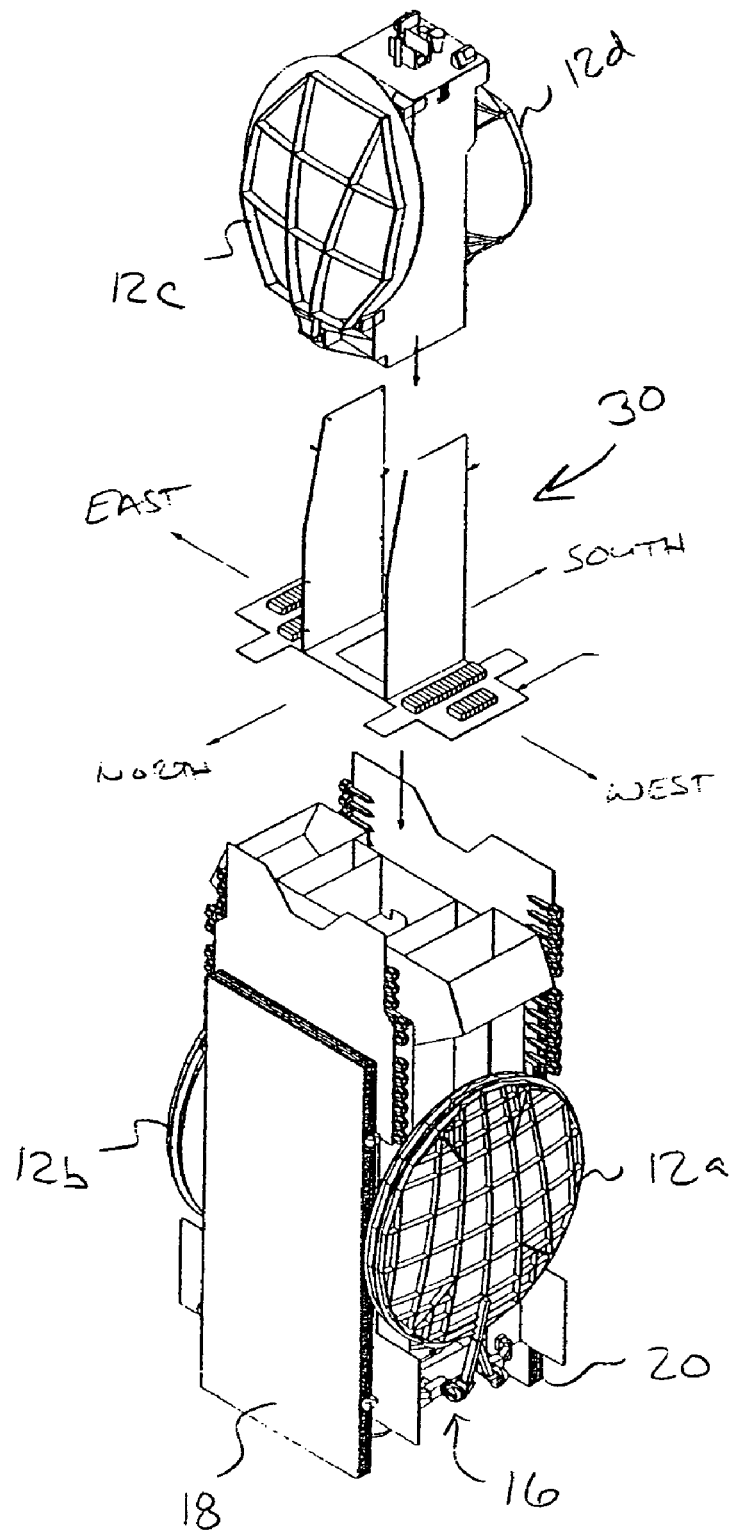
FIG. 2 is a diagram depicting an exploded view of a portion of a satellite.

FIG. 2 is a diagram depicting an exploded view of a portion of satellite 10. Specifically, FIG. 2 includes payload compartment 16 having reflector dish antennas 12*a* and 12*b* and thermal radiator panels 18 and 20 mounted thereon. Separated from payload compartment 16 in FIG. 2 are reflector dish antennas 12*c* and 12*d* and a thermal management system 30 according to one embodiment of the invention. Thermal management system 30 will now be described with reference to FIG. 3.

Figure 3:
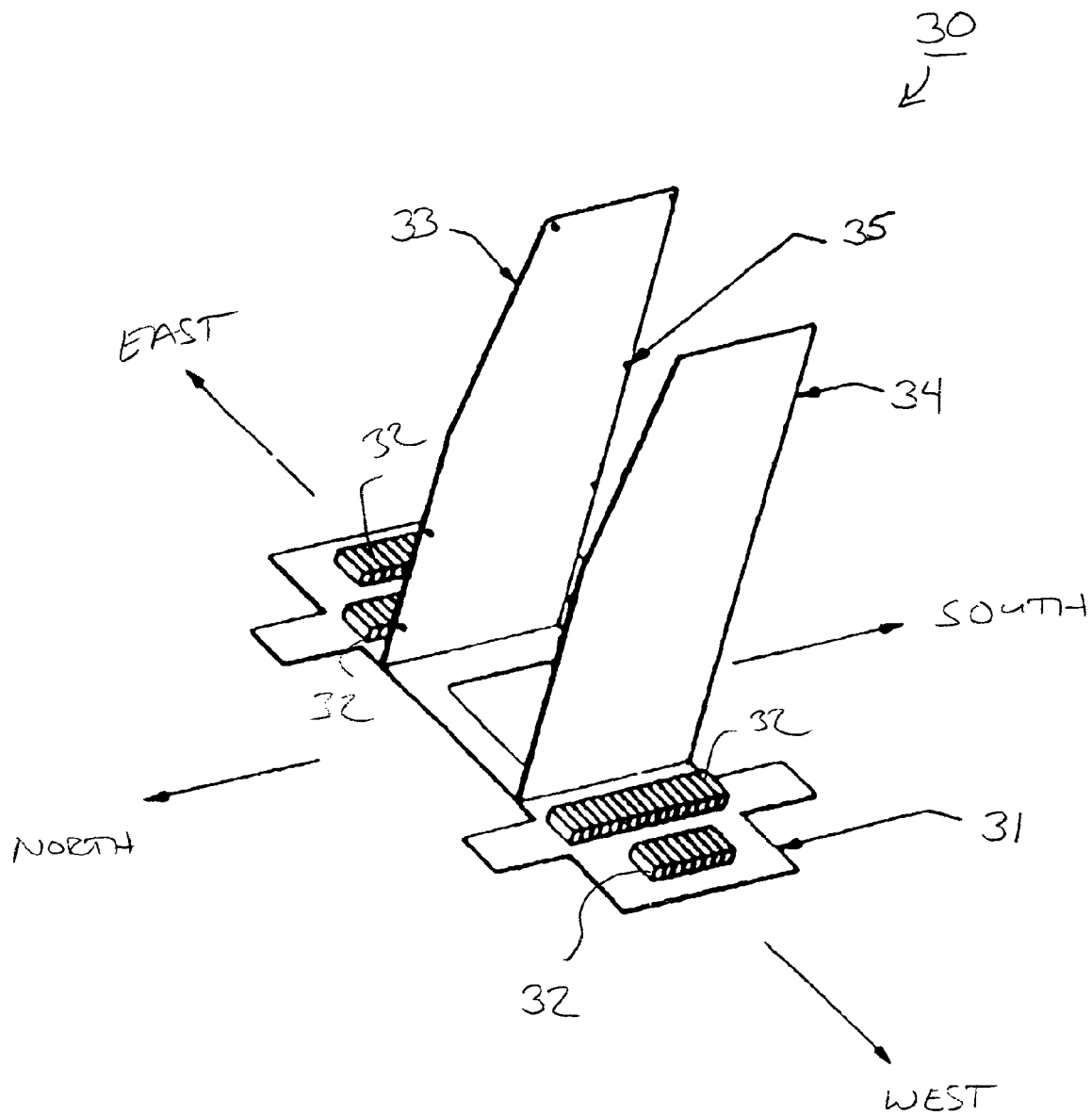
FIG. 3 is a diagram depicting a thermal management system according to one embodiment of the invention.

As shown in FIG. 3, thermal management system 30 includes a central platform 31 on which components 32 are mounted. Components 32 may include electrical components such as amplifiers, power supplies, filters, multiplexers, etc. As noted above, electrical components typically generate unwanted heat. To prevent the malfunction or failure of these heat dissipating components, thermal management system 30 uses thermal radiator panels 33 and 34, which are mounted on central platform 31, to radiate the unwanted heat into space.

Thermal radiator panels 33 and 34 are constructed using a thermally conductive material. A wide range of materials known to those skilled in the art may be used to implement thermal radiator panels 33 and 34 and the invention is not intended to be limited to any particular one of those materials. To transfer heat dissipated by components 32 to thermal radiator panels 33 and 34, central platform 31 is constructed using a thermally conductive material and is thermally coupled to thermal radiator panels 33 and 34. In this manner a heat transfer path is formed between components 32 and thermal radiator panels 33 and 34. The thermally conductive material used for central platform 31 may be the same material as that used for thermal radiator panels 33 and 34 or it may be a different thermally conductive material.

Thermal coupling of central platform 31 and thermal radiator panels 33 and 34 may be achieved using any of a number of techniques known to those skilled in the art. For example, thermal mechanical joints may be formed where thermal radiator panels 33 and 34 contact central platform 31. Alternatively, one or more heat pipe systems may be used for thermally coupling. For example, an out-of-plane heat pipe panel construction may be used for thermal radiator panels 33 and 34 and central platform 31. A wide variety of heat pipe systems are well known in the art and any of these may be used to implement embodiments of the invention without departing from the scope of the invention.

As represented in FIG. 2, the structure supporting reflector dish antennas 12*c* and 12*d* is positioned between thermal radiator panels 33 and 34. With this arrangement, thermal radiator panel 33 has an exposed face which faces East when satellite 10 is in orbit. Similarly, thermal radiator panel 34 has an exposed face which faces West when satellite 10 is in orbit. Accordingly, previously unused surface areas of the satellite are occupied by thermal radiator panels 33 and 34. This increases the overall thermal dissipation capacity of the satellite without increasing the size of the satellite or requiring a more complicated set of deployable radiators.

Because thermal radiator panel 33 faces East and thermal radiator panel 34 faces West, each will be exposed to direct sunlight at different times. By thermally coupling central platform 31 to both thermal radiator panels 33 and 34, heat generated by components 32 can be dissipated through both thermal radiator panels or through only one if the other is exposed to sunlight. This arrangement also allows heat to be transferred from one side of the satellite to the other. One skilled in the art will recognize that various heat pipe techniques may be used to thermally isolate one of thermal radiator panels 33 and 34 from central platform 31 while the thermal radiator panel is directly exposed to sunlight.

According to one embodiment of the invention, thermal management system 30 is thermally isolated from the rest of satellite 10. Thermal isolation is achieved by using materials having high thermal impedance to form the supports and connectors between thermal management system 30 and the rest of the satellite. These supports include supports 35 shown in FIG. 3 for positioning the associated structure of reflector dish antennas 12*c* and 12*d*. Similar supports or connectors are also used to position thermal management system 30 onto payload compartment 16, as shown in FIG. 2. Materials having a high thermal impedance are well known to those skilled in the art and the invention is not intended to be limited to any particular one of those materials.

Thermal isolation provides significant advantages to the overall operation of the satellite. Primarily, this embodiment of the invention allows different thermal zones to be maintained within the satellite. Accordingly, components 32 within thermal management system 30 can be maintained at a different temperature than other payload components that are thermally coupled to the North/South thermal radiator panels 18 and 20. In this manner, different components can be maintained closer to their optimal operating ranges.

Figure 4:
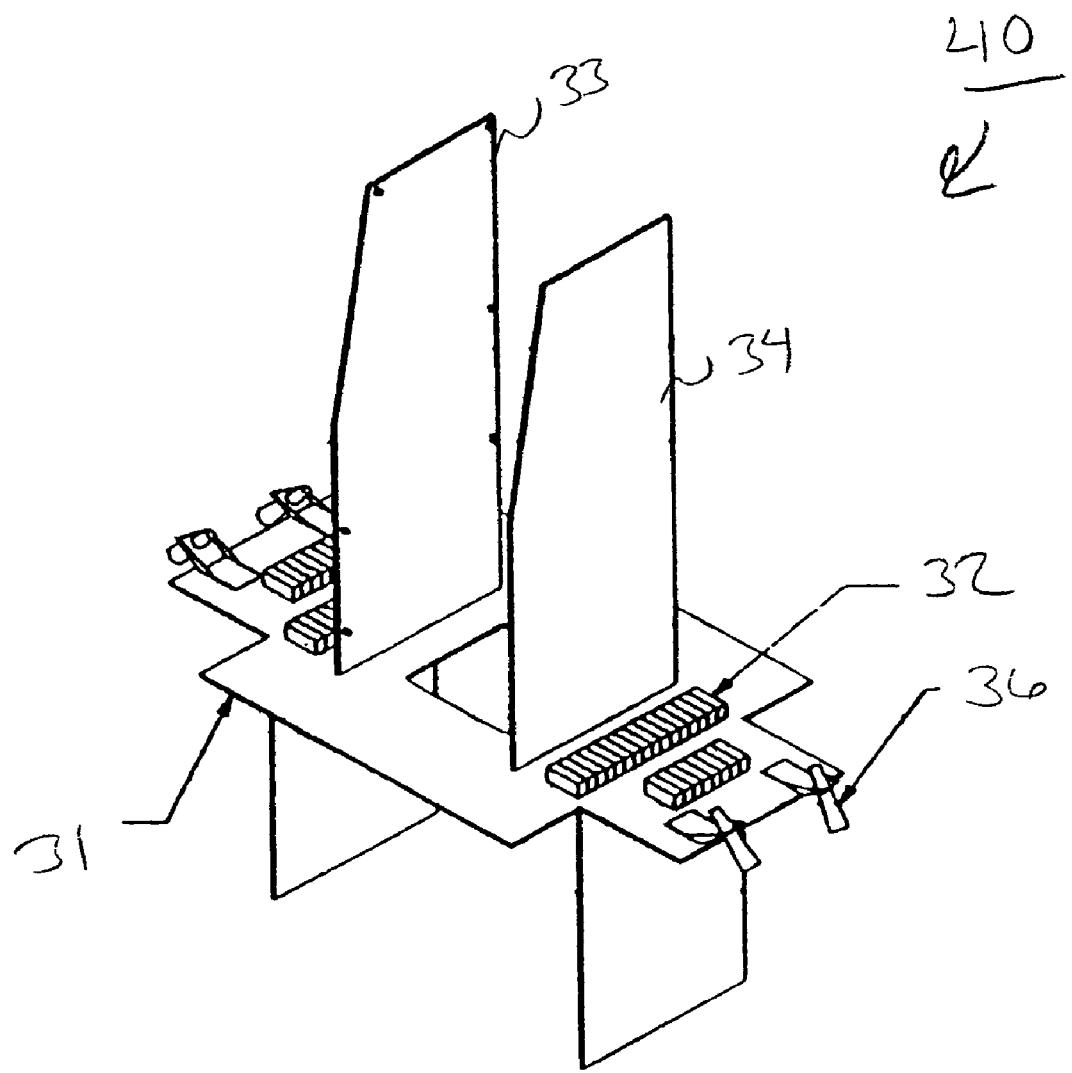
FIG. 4 is a diagram depicting a thermal management system according to one embodiment of the invention.

In alternative embodiments of the invention, central platform 31 can be thermally coupled to thermal radiator panels 18 and 20 in addition to thermal radiator panels 33 and 34. FIG. 4 is a diagram depicting one example of a thermal management system configured for this arrangement. As shown in FIG. 4, the edges of central platform 31 that are perpendicular to the faces of thermal radiator panels 33 and 34 are extended out beyond those shown in FIG. 3. These edges allow central platform 31 to be thermally coupled to one or both of thermal radiator panels 18 and 20. As with thermal radiator panels 33 and 34, this thermal coupling can be formed using either one or more thermal mechanical joints at the point of contact or using any of a number of known heat pipe systems. In this manner, thermal management system 40 is able to supplement the overall heat dissipation capacity of the satellite.

Thermal management system 40 depicted in FIG. 4 also includes feed horns 36 mounted on central platform 31. Feed horns 36 are used to send and receive radio frequency signals using reflector dish antennas. By configuring central platform 31 to provide space for mounting both feed horns 36 and multiplexers (component 32), shorter line lengths and therefore less line loss can be attained using this embodiment of the invention. While FIG. 4 is used to depict both thermal coupling of central platform 31 to thermal radiator panels 18 and 20 and mounting feed horns 36 on central platform 31, one skilled in the art will understand that these represent different aspects of the invention that may be practiced together or in separate embodiments.

Figure 5:
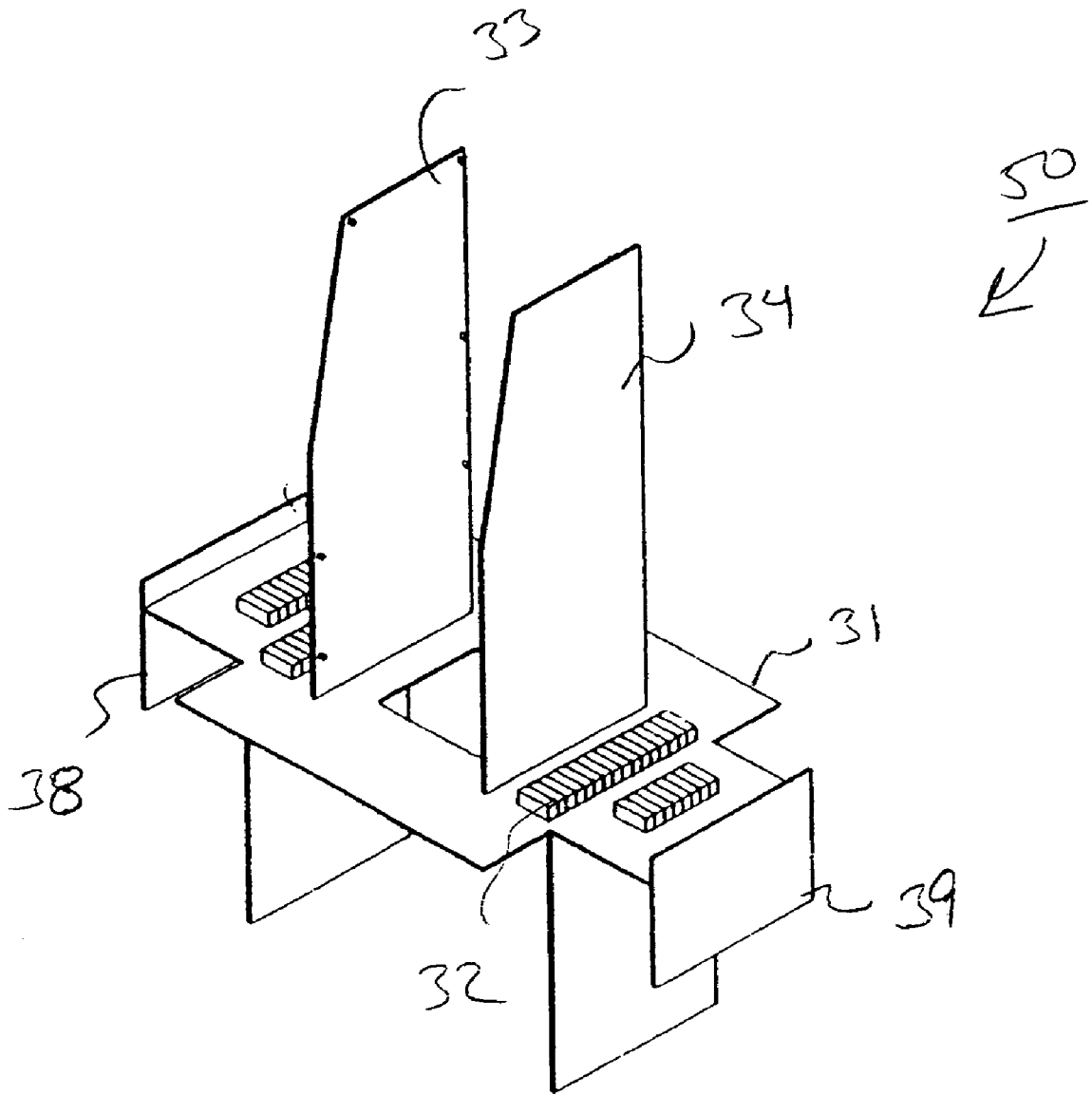
FIG. 5 is a diagram depicting a thermal management system according to one embodiment of the invention.

FIG. 5 depicts a thermal management system according to another embodiment of the invention. Similar to the embodiments shown in FIGS. 3 and 4, thermal management system 50 depicted in FIG. 5 includes central platform 31, components 32 and thermal radiator panels 33 and 34. To further improve heat dissipation capacity and take advantage of available area on a satellite, thermal management system 50 includes additional thermal radiator panels 38 and 39 mounted on the ends of central platform 31. As with thermal radiator panels 33 and 34, thermal radiator panels 38 and 39 have faces exposed to the East and West, respectively, when the satellite is in orbit. Thermal radiator panels 38 and 39 are thermally coupled to central platform 31 using either thermal mechanical joints or one or more known heat pipe systems. In this manner, additional heat generated by payload components, either mounted on central platform 31 if thermal management system 50 is thermally isolated from the rest of the satellite, or other payload components if thermal management system 50 is thermally coupled to thermal radiator panels 18 and 20.

The previous description is provided to enable any person skilled in the art to practice the various embodiments described herein. Various modifications to these embodiments will be readily apparent to those skilled in the art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more". All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claims is:

1. A satellite thermal management system for dissipating excess heat generated within a satellite, comprising:
   a central platform for mounting a heat dissipating component;
   a first thermal radiator panel mounted to said central platform, wherein an exposed face of said first thermal radiator panel is arranged to face East when the satellite is in orbit;
   a second thermal radiator panel mounted to said central platform, wherein an exposed face of said second thermal radiator panel is arranged to face West when the satellite is in orbit; and
   a high thermal impedance support for mounting said satellite thermal management system to a satellite and thermally isolating said satellite thermal management system from other parts of the satellite,
   wherein said first thermal radiator panel and said second thermal radiator panel are thermally coupled to said central platform and are configured to radiate heat dissipated by the heat dissipating component mounted on said central platform.

2. The satellite thermal management system according to claim 1, wherein said first thermal radiator panel and said second thermal radiator panel are thermally coupled to said central platform by a first thermal mechanical joint and a second thermal mechanical joint.

3. The satellite thermal management system according to claim 1, wherein said first thermal radiator panel and said second thermal radiator panel are thermally coupled to said central platform by a first heat pipe system and a second heat pipe system.

4. The satellite thermal management system according to claim 1, wherein the heat dissipating component comprises a multiplexer.

5. The satellite thermal management system according to claim 1, wherein a plurality of heat dissipating components are mounted on said central platform.

6. The satellite thermal management system according to claim 5, wherein the plurality of heat dissipating components comprises a multiplexer and a feed.

7. The satellite thermal management system according to claim 1, wherein said satellite thermal management system is thermally coupled to at least one of a third thermal radiator panel and a fourth thermal radiator panel, wherein an exposed face of said third thermal radiator panel is arranged to face North when the satellite is in orbit and an exposed face of said fourth thermal radiator panel is arranged to face South when the satellite is in orbit.

8. The satellite thermal management system according to claim 7, wherein the third thermal radiator panel and the fourth thermal radiator panel are thermally coupled to said central platform by a third thermal mechanical joint and a fourth thermal mechanical joint.

9. The satellite thermal management system according to claim 7, wherein the third thermal radiator panel and the fourth thermal radiator panel are thermally coupled to said satellite thermal management system by a third heat pipe system and a fourth heat pipe system.

10. A satellite thermal management system for dissipating excess heat generated within a satellite, comprising:
    a first platform for mounting a first heat dissipating component;
    a first thermal radiator panel mounted to said first platform, wherein an exposed face of said first thermal radiator panel is arranged to face East when the satellite is in orbit;
    a second thermal radiator panel mounted to said first platform, wherein an exposed face of said second thermal radiator panel is arranged to face West when the satellite is in orbit;
    a second platform for mounting a second heat dissipating component;
    a third thermal radiator panel thermally coupled to said second platform, wherein an exposed face of said third thermal radiator panel is arranged to face North when the satellite is in orbit; and
    a fourth thermal radiator panel thermally coupled to said second platform, wherein an exposed face of said fourth thermal radiator panel is arranged to face South when the satellite is in orbit,
    wherein said first thermal radiator panel and said second thermal radiator panel are thermally coupled to said first platform and are configured to radiate heat dissipated by the first heat dissipating component mounted on said first platform.

11. The satellite thermal management system according to claim 10, wherein said first thermal radiator panel and said second thermal radiator panel are thermally coupled to said first platform by a first heat pipe system and a second heat pipe system.

12. The satellite thermal management system according to claim 10, wherein said first thermal radiator panel and said second thermal radiator panel are thermally coupled to said first platform by a first thermal mechanical joint and a second thermal mechanical joint.

13. The satellite thermal management system according to claim 10, further comprising a high thermal impedance support for mounting said first platform, said first thermal radiator panel and said second thermal radiator panel to the satellite and thermally isolating said first platform, said first thermal radiator panel and said second thermal radiator panel from other parts of the satellite.

14. The satellite thermal management system according to claim 10, wherein the second heat dissipating component comprises a multiplexer.

15. The satellite thermal management system according to claim 10, wherein a plurality of heat dissipating components are mounted on said first platform.

16. The satellite thermal management system according to claim 15, wherein the plurality of heat dissipating components comprises a multiplexer and a feed.

17. The satellite thermal management system according to claim 10, wherein said first platform is thermally coupled to at least one of said third thermal radiator panel and said fourth thermal radiator panel.

18. The satellite thermal management system according to claim 17, wherein said third thermal radiator panel and said fourth thermal radiator panel are thermally coupled to said first platform by a third thermal mechanical joint and a fourth thermal mechanical joint.

19. The satellite thermal management system according to claim 17, wherein said third thermal radiator panel and said fourth thermal radiator panel are thermally coupled to said first platform by a third heat pipe system and a fourth heat pipe system.

* * * * *